June 29, 1943.   R. S. DRUMMOND   2,322,793
GEAR FINISHING TOOL
Filed Aug. 21, 1939   3 Sheets-Sheet 1

INVENTOR.
ROBERT S. DRUMMOND
BY *Whittemore, Hulbert and Belknap*
ATTORNEYS

June 29, 1943.  R. S. DRUMMOND  2,322,793
GEAR FINISHING TOOL
Filed Aug. 21, 1939  3 Sheets-Sheet 2

INVENTOR.
ROBERT S. DRUMMOND
BY Whittemore, Hulbert
and Belknap ATTORNEYS

June 29, 1943.         R. S. DRUMMOND         2,322,793
GEAR FINISHING TOOL
Filed Aug. 21, 1939         3 Sheets—Sheet 3
FIG.14.
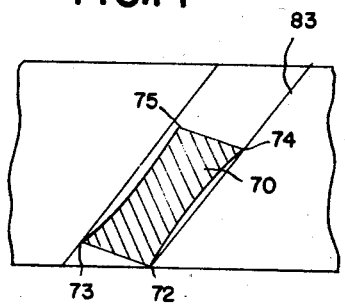
FIG.15.
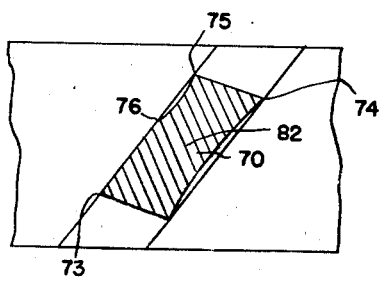
FIG.16.
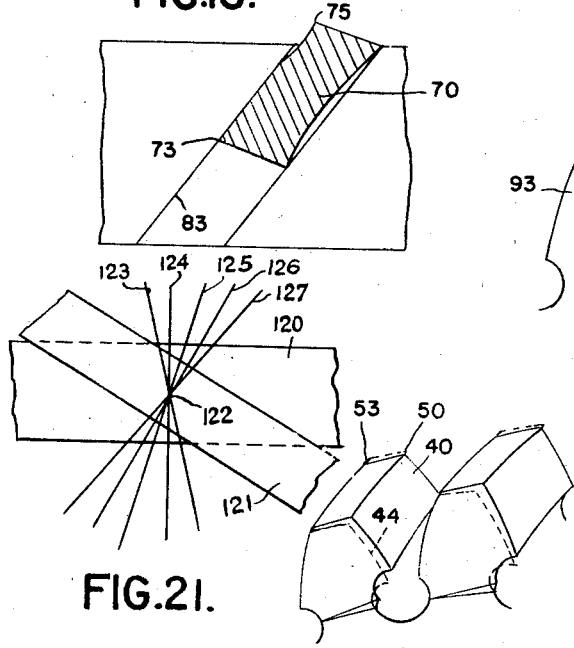
FIG.17.
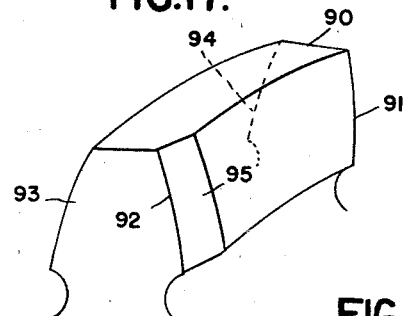
FIG.19.
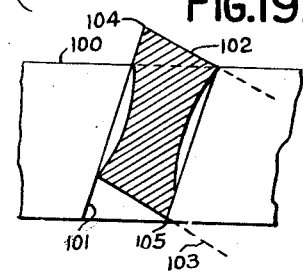
FIG.21.
FIG.18.
FIG.20.
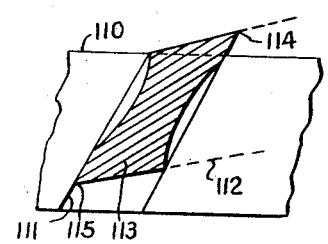
INVENTOR.
ROBERT S. DRUMMOND
BY Whittemore, Hulbert
and Belknap
ATTORNEYS Patented June 29, 1943

2,322,793

UNITED STATES PATENT OFFICE 2,322,793

GEAR FINISHING TOOL

Robert S. Drummond, Detroit, Mich.

Application August 21, 1939, Serial No. 291,266

9 Claims. (Cl. 29—103)

The present invention relates to gear finishing and more particularly to the finishing of internal gears.

The finishing of internal gears by the use of a gear cutter in the form of a gear conjugate to the gear to be finished and adapted to mesh therewith at limited crossed axes presents several difficulties which are not present in the finishing of external gears by this method. A cutter in mesh with an internal gear is analogous to a cylinder within another cylinder with their axes crossed. As will be readily apparent, this results in a tendency for the gear cutter to bind at its ends and for the teeth of the cutter to effect the cutting action only at their corners. There is accordingly clearance between mid portions of the cutter teeth and the gear teeth. It has been found that when internal gears are finished at crossed axes, there is a tendency for the cutter to leave metal on diagonally opposite corners of the gear teeth.

It is an object of the present invention to overcome this difficulty and to finish internal gears so that their teeth are uniform from end to end.

It is an object of the present invention to finish internal gear teeth with a tool particularly modified to avoid leaving high profiles at diagonally opposite corners of the gear teeth.

It is a further object of the present invention to provide a novel finishing tool for finishing internal gears which has its teeth relieved at one corner.

It is a further object of the present invention to provide a tool for finishing internal gears which has its teeth provided with helical relief at diagonally opposite corners thereof.

It is a further object of the present invention to provide a cutter for internal gears having teeth, the ends of which are formed to occupy a plane parallel to the end surface of the gear being finished.

Other objects of the invention will be apparent as the description proceeds, and when taken in conjunction with the accompanying drawings wherein:

Figure 1 is a fragmentary elevation partly in section showing a gear finishing machine of the type referred to;

Figure 6 is a fragmentary perspective of a portion of a gear cutter of the type referred to;

Figure 7 is an enlarged fragmentary perspective of a single tooth of a cutter of the type referred to;

Figures 9 to 16 are diagrammatic views showing the relationship between a tooth of a cutter and a tooth space of an internal gear;

Figure 17 is an enlarged perspective view of a cutter tooth embodying the present invention;

Figure 18 is a diagrammatic view showing the modification at the ends of the cutter teeth;

Figure 19 is a diagrammatic view illustrating the necessary modification for a cutter tooth of the opposite hand as the gear being finished;

Figure 20 is a diagrammatic view of the necessary modification of a cutter tooth of the same hand and having a greater helix angle than the gear being finished; and Figure 21 is a diagrammatic view illustrating the various possible relationships between helix angles of gear and cutter.

Figure 1:
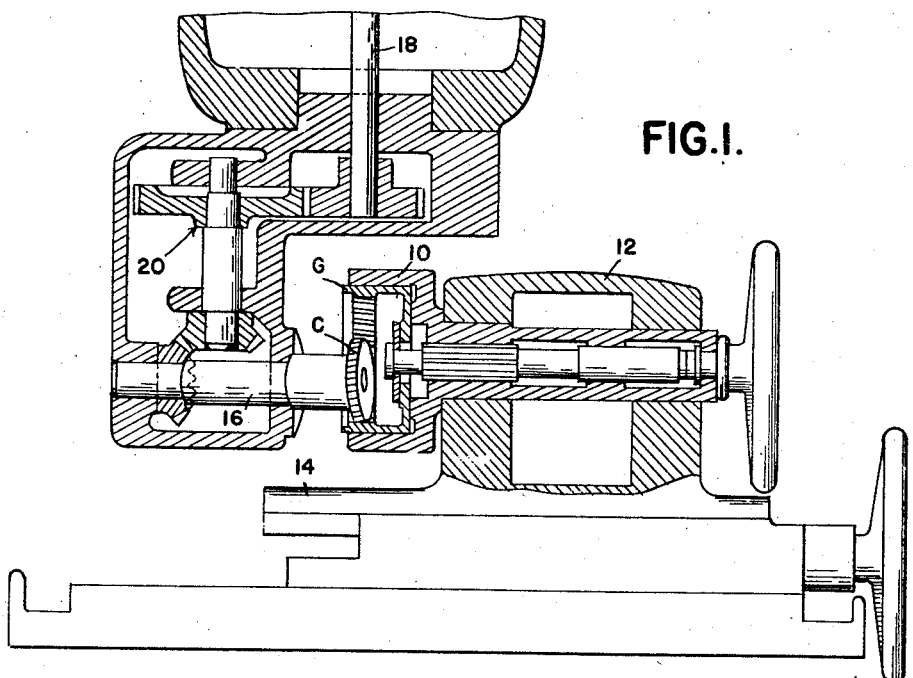

In Figure 1 I have illustrated a typical set-up for machining internal gear teeth. The gear to be finished is indicated at G and is mounted in a suitable fixture 10, rotatably carried in a stock 12, which in turn is carried by a carriage 14 mounted for reciprocation in a direction parallel to the axis of the gear G. The finishing tool is in the form of a gear-like cutter C carried by a spindle 16. Rotation is imparted to the spindle 16 from a motor (not shown) which drives a shaft 18. The shafts 18 and 16 are connected by suitable gearing indicated at 20. Alternatively, gear G may be driven directly, and cutter C driven through intermeshing engagement therewith.

The gear G is mounted for free rotation, and it is rotated through the intermeshing action with the cutter C.

During rotation of the gear G and cutter C a relative translation is introduced between the parts, and in this instance is illustrated as being provided by an axial reciprocation with the carriage 14. This may be accomplished manually or mechanically, and preferably is accompanied further with an automatic feed of the gear G vertically upward at the end of each translation.

Figure 6:
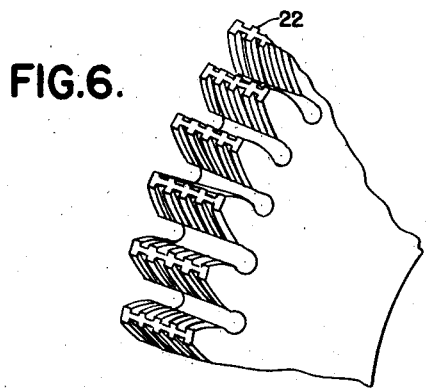
Figure 7:
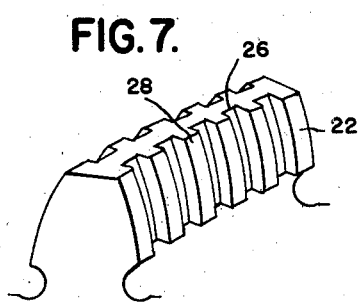

The cutter C is of a type illustrated in Figure 6, which is a perspective of a fragmentary portion thereof. The cutter comprises a gear-like body provided with teeth 22, each of which has cutting edges on its surface, and preferably oil clearance channels are provided. As seen in Figure 7, the teeth 22 are provided with grooves or serrations 26 which extend generally straight up and down the faces of the teeth and leave intermediate lands 28 having cutting edges at the corners thereof.

In order to appreciate the modification which I have made in cutters for finishing internal gears, it is desirable to review briefly some of the geometry involved. In Figures 2 to 5 I have shown relationship between internal and external gears, and have indicated some of the problems presented.

Figure 2:
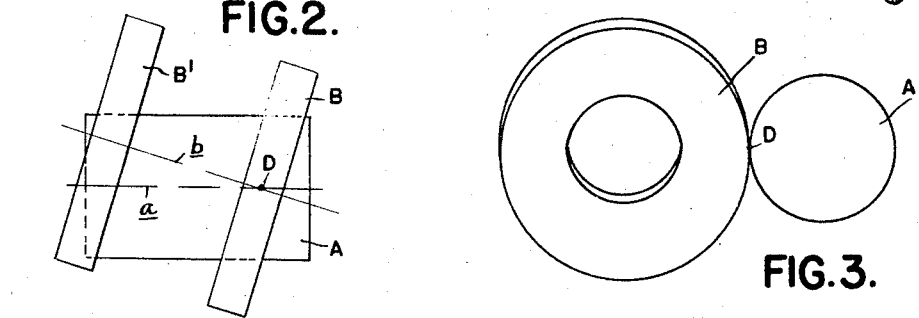
Figure 2 is a diagrammatic view illustrating the relationship between an external gear and an external cutter.

Referring first to Figure 2, if it is assumed that a cylinder A is contacted externally by a second cylinder B so that the axes of the cylinders are crossed, it will be appreciated that the two cylinders are in theoretic point contact (as indicated at the point D). In this figure I have indicated the axis of the cylinder B as $b$ and the axis of the cylinder A as $a$. If now the two cylinders A and B are relatively moved as by moving the cylinder B along the axis $b$ until it occupies the position indicated at B', it will be appreciated that the two cylinders are now out of contact.

Figure 3:
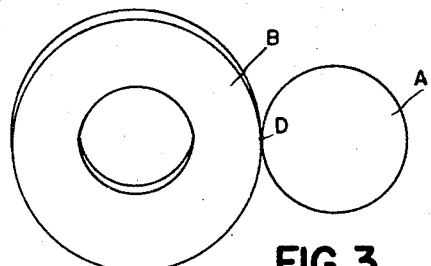
Figure 3 is a diagrammatic end view of the part shown in Figure 2.
Figure 4:
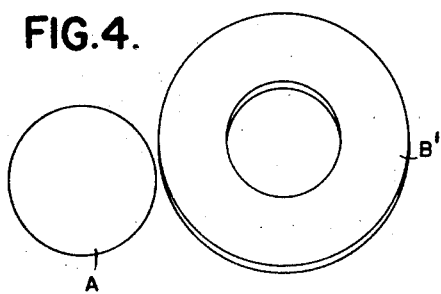
Figure 4 is a view similar to Figure 3 showing the parts in a different position.
Figure 5:
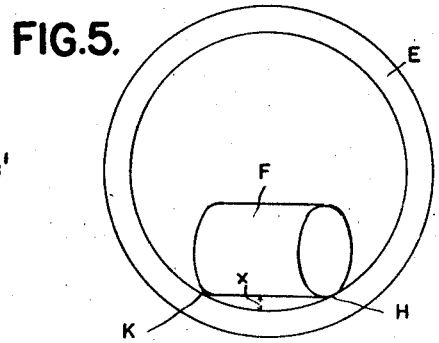
Figure 5 is a diagrammatic view illustrating the relationship between a cutter and an internal gear.

Figure 3 is an end view looking from the left, showing the cylinders A and B in contact at the point D, and Figure 4 is an end view taken from the right in Figure 2, showing the cylinder A out of contact with the cylinder in the position B'.

From the foregoing, it will be evident that if cylinders A and B are respectively an external gear and an external gear finishing tool, they will contact generally only in a zone adjacent the point D, which is determined by the center of crossing of the axes $a$ and $b$. Relative reciprocation of the parts along the line of their axes, or in fact in any direction in a plane parallel to both axes, may be continued indefinitely, and the only effect will be that if sufficient relative movement is imparted the two cylinders will come out of contact.

A different condition, however, exists in the case of a pair of cylinders in contact, with one inside the other. I have illustrated this in Figure 5, in which the hollow cylinder E is shown as having in contact with the interior thereof a second cylinder F. It will be apparent that the cylinder F, if of a size to be received completely within the cylinder E, will contact the entire surface thereof at two points, which I have indicated at H and K. It will further be noted in Figure 5 that the center of the cylinder F is in spaced relation to the surface of the cylinder E, as indicated at $x$.

From the foregoing, it will be evident that if the cylinder E is an internal gear and if the cylinder F is a cutter therefor, contact between the cutter and the gear will be substantially limited to the ends of the cutter teeth. The mid portions of the cutter teeth are in a condition of clearance with respect to the gear teeth.

Figure 8:
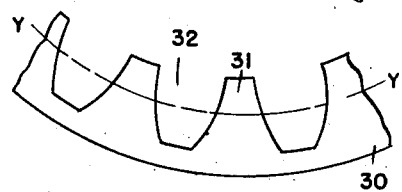
Figure 8 is a fragmentary end view of an internal gear adapted to be finished by the present invention.

Figure 8 is a fragmentary portion of an internal gear 30, having teeth 31 and tooth spaces 32. In Figures 9 to 15 I illustrate a fragmentary diagrammatic developed section of the cutter 30 taken along the line $y$—$y$ in Figure 8. In these figures I illustrate a tooth space of the gear and show in section therein a cutter tooth in contact with the sides of the teeth which define the tooth space.

Figure 9:
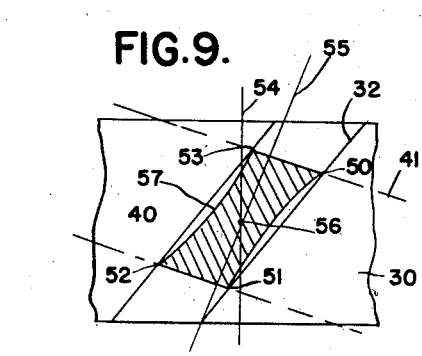

Referring first to Figure 9, the tooth space 32 appears as a straight-sided slot in the developed view. The tooth 40 is a tooth of a cutter whose outline is indicated by the dotted lines 41. Since the section is taken on the line $y$—$y$, the faces of the cutter tooth C appear as concave, leaving the cutter in contact with the sides of the teeth of the tooth space 32 at the four points 50, 51, 52 and 53. The axis of the gear is indicated at 54, and the axis of the cutter is indicated at 55. The center of the crossed axes is indicated by the numeral 56, and examination of Figure 9 indicates that the parts are symmetrically related to the center of crossed axes and that the teeth of the cutter have a lesser helix angle than the teeth of the gear.

Inasmuch as there is a clearance between the mid portion of the tooth 40 and the side walls of the tooth space 32, as indicated at 57, it will be appreciated that cutting takes place only at and adjacent the corners of the cutter teeth. As a result of this, the teeth may, if desired, be formed without the serrations illustrated in Figure 7, and the sharp corners of the teeth may be employed as the cutting edges. It is preferred, however, to provide these serrations for two reasons. In the first place, the condition of clearance illustrated at 57 in Figure 9 is, of course, very much exaggerated and some cutting action will ordinarily take place at a point removed from the extreme corner of the teeth. Also even though the cutting action is limited strictly to the corners of the gear teeth, it is desirable to provide the serrations 28 for the reason that these provide a passage for oil and chips formed in the cutting operation.

Figure 10:
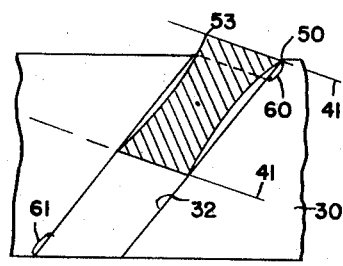

Relative translation between the gear and cutter as described in connection with Figure 1 of the drawings results eventually in the cutter tooth 40 reaching a position as shown in Figure 10, in which one corner 53 has moved out of contact with the slot 32. It will be appreciated that this reduces the guiding contact between the cutter and the gear. As previously stated, rotation of the gear or the cutter depends only upon the intermeshing action between the gear and cutter, and it is therefore essential, in order to accurately finish the gear, to maintain this guiding action and particularly angular support. When the parts occupy the relationship illustrated in Figure 10, the cutter tooth is not properly supported, and as will be obvious the corner 50 becomes substantially unsupported as soon as the corner 53 emerges from the tooth slot 32. This results in the corner 50 backing off from the corresponding side wall of the slot 32 with the result that metal is left on the side of the slot throughout a zone indicated at 60. The amount of metal left throughout the zone 60 may be readily determined by a suitable checking of the lead. This appears ordinarily as only a very few ten-thousandths of an inch, but it is undesirable, particularly since it tends to produce end-bearing, which in turn is noisy and detracts from the efficiency of the internal gear in subsequent operation.

It will be appreciated that in like manner, during reverse reciprocation, material will be left in a zone 61 at the opposite end of the tooth slot 32.

Figure 11:
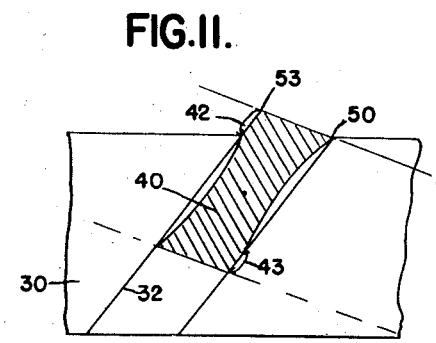

In order to overcome the difficulty just described, it is possible to modify the teeth of the cutter in one of two manners: In Figure 11 I have illustrated one manner of overcoming the objection outlined. In Figure 11 I show the cutter tooth 40 as having portions 42 and 43 helically relieved by an amount equal to the error observed at the zones 60 and 61. Obviously, where an obtuse end corner 53 or 51 emerges first from the tooth slot 32, helically relieved surfaces 42 and 43 extend at a decreased lead or increased helix angle. This increased helix angle is preferably uniform or substantially uniform. As will be observed in this figure, when the corner 53 has emerged so that the corner 50 is at the extreme end of the tooth slot 32, the portion of the tool tooth 40 opposite the corner 50 is still in contact with the tooth slot 32. In this case, as will be evident, the cutting action may take place due to serrations within the zone 42, or it may, if preferred, take place solely by the corner 53. When area 42, 43 is made with this new helix, a corresponding adjustment of crossed axes is of course made.

Figure 12:
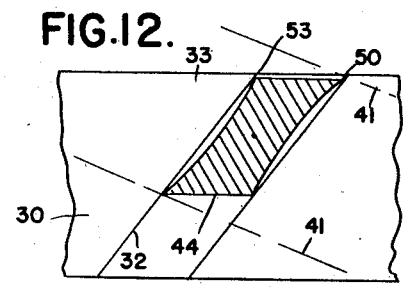

The same result is accomplished by a somewhat different modification illustrated in Figures 12 and 18, in which the cutter tooth 40 has its ends formed so that their end surfaces 44 are parallel to the end surfaces 33 of the gear blank. As will be evident, in this case the corners 50 and 53 emerge from the tooth slot 32 at the same time, so that there is no opportunity for either corner to cut when not supported by the opposite corner. In Figure 12 I have indicated the outline of the cutter by the dotted lines 41. In Figure 18, the unmodified tooth is shown in dotted, the modified tooth in full lines.

The foregoing modification of the internal cutter is based upon the initial premise that the cutter and the gear were to be employed in a symmetrical condition; that is, with the center of the crossed axes adjacent the mid portion of the cutter tooth 40. In many cases, in finishing internal gears, it is impossible to employ a cutter and gear with strictly symmetrical relationship, for the reason that internal gears are oftentimes provided with shoulders which prevent employment of the symmetrical relationship.

Figure 13:
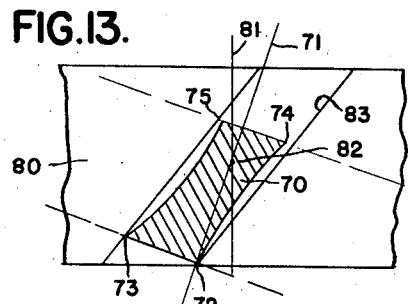

In Figures 13 to 15 I have indicated conditions existing when the center of crossed axes is located adjacent one end of the cutter tooth 70. In this case, the axis of a gear 80 is indicated at 81 and the axis of the cutter is shown at 71. The center of crossed axes 82 is therefore adjacent one end of the cutter tooth 70. Under these circumstances a cutter tooth, if unmodified, engages the slot 83 at only two corners, 72 and 73. The corners 74 and 75 are both in a condition of clearance relative to the slot 83. Under these circumstances, of course, accurate cutting would be impossible.

In order to retain accurate cutting, the cutter tooth is modified as follows: As shown in Figure 14, it will be possible to relatively adjust the gear and cutter so as to bring the corners 72, 73 and 74 in contact by a proper adjustment of the crossed axes setting. This, however, would merely increase the amount of clearance present between the corner 75 and a side wall of the slot 83. I have illustrated this condition in Figure 14.

In Figure 15 I have shown the cutter tooth 70 as modified, by being helically relieved from the corner 73 to a point 76 substantially adjacent to the center of crossed axes 82. It will be observed in this figure that the cutter 70 now contacts on all corners 72 to 75. It will further be observed by reference to Figure 16 that the tooth 70 is adequately supported, even after the corner 75 emerges from the slot 83, by reason of the extended bearing present from the corner 73 inwardly of the tooth, due to the helical relief provided.

If preferred, the helical relief from the corner 73 may be extended completely to the adjacent corner 75, with the result that the tooth will then be substantially tapered, having different helix angles on opposite faces thereof.

I have illustrated in Figure 17 a cutter tooth 90 made according to the present invention, which has cutting corners 91, 92, 93 and 94. In this tooth I have illustrated one corner of the tooth provided with the proper helical relief, as indicated at 95. I desire it to be understood that this cutter tooth may be provided with slots or serrations such as shown at 26 in Figure 7, or these may be omitted. When the serrations are omitted, the cutting is done by the corners 91 to 94. In the event that the corners 91 to 94 are solely relied upon for the cutting action, it is desirable, however, to provide serrations, such as shown at 26 in Figure 7, or in the forms of relief slots (which need, of course, not have sharp cutting corners) for the disposal of chips.

In the foregoing description the principles involved in the present invention have been fully set forth, and for purposes of illustration Figures 9 to 16 indicate the relationship between a cutter and gear of the same hand. Reference in Figure 11 has been made to the relief of the corners of the tooth of the cutter which, during reciprocation, emerge first from the tooth space of the gear. As indicated in Figure 11, these corners, where the gear and cutter are of the same hand, are obtuse end corners of the cutter tooth. Reference has also been made in Figures 15 and 16 to the relief of a corner of the tooth of the cutter which, during reciprocation, emerges from the tooth space of the gear after another corner has emerged. As indicated in these latter figures, the relieved corner, where the gear and cutter are of the same hand, is an acute angled end corner of the cutter tooth. In each instance, the cutter is adequately supported to effect accurate cutting.

In Figure 19 I have indicated the relationship where the gear and cutter are of the opposite hand. In this figure the outline of the gear is indicated at 100 and a tooth slot 101 is shown, the gear 100 being, as shown, a left-hand gear. In the same figure a meshing tooth 102 of a cutter 103 is shown, this tooth, as indicated, being a tooth of a right-hand cutter. As seen in Figure 19, the teeth of the cutter 103 have a different helix angle than the teeth of the gear 100, and the corners 104 and 105 of the cutter 103 will emerge first from the tooth slot 101 of the gear upon relative translation or reciprocation between the parts. Accordingly, in this instance it is the acute-angled corners of the gear tooth surfaces which are relieved. As will be obvious, providing helical relief on tooth surfaces adjacent the acute-angled end corners will provide relieved surfaces having a reduced helix angle.

In Figure 20 I have indicated diagrammatically the relationship between a gear 110 having a tooth slot 111 and a cutter 112 having a tooth 113. In this case the gear 110, as shown, is a left-hand gear and the cutter 112 has teeth extending at a left-hand helix. Accordingly, the gear 110 and the cutter 112 are of the same hand and, as will be observed in this figure, the helix angle of the cutter is greater than the helix angle of the gear. In this instance, it will be observed that the corners 114 and 115 will emerge first from the tooth slot 111 upon relative translation or reciprocation between the gear and cutter, and corners 114 and 115 of the cutter tooth 113 are the acute-angled end corners and, as will be obvious from an inspection of Figure 20, it is the surfaces of the teeth 113 adjacent these acute-angled corners which will be provided with helical relief in this instance.

While the foregoing description is believed adequate to enable those skilled in the art to apply the teachings of the present invention to all cases, for the purpose of completeness I have indicated in Figure 21 diagrammatically the outline of a portion of a gear 120, and superimposed thereover the outline of a meshing cutter 121. The center of crossed axes is indicated at 122, and the lines 123, 124, 125, 126 and 127 indicate the direction which meshing teeth may take. It will be observed that if the meshing teeth on the gear and cutter lie along the line 123, the gear 120 will be a right-hand gear and the cutter 121 will be a right-hand cutter. It will be appreciated that the portion of the cutter seen, is intended to represent the lower portion of the cutter, bearing the teeth which are meshing with the teeth of the gear 120.

If the meshing teeth between the gear 120 and cutter 121 lie along the line 124, it will be observed that the gear is a spur gear and the cutter is a right-hand cutter.

If the teeth of the gear 120 and cutter 121 lie along the path of the line 125, it will be observed that the gear is a left-hand gear and the cutter is a right-hand cutter.

It will further be observed that if the teeth of the gear 120 and cutter 121 were to lie along the line 126, the gear 120 would be a left-hand gear and the cutter 121 would be a spur cutter.

It will further be observed that if the teeth of the gear 120 and cutter 121 were to lie along the line 127, the gear 120 would be a left-hand gear and the cutter 121 would be a left-hand cutter.

The foregoing covers all cases. It will be observed that of the five lines shown, 123 to 127, it is only when the meshing teeth lie along the line 127 that an obtuse corner of a tooth of the cutter 121 will emerge first from the tooth slot of the gear 120. In all other cases, with the exception of when the meshing teeth lie along the line 126 and the cutter is a spur cutter, it is an acute angle which emerges first.

As previously stated, the amount of error introduced by unmodified teeth in cutting internal gears is very slight, varying from a negligible amount to only a few ten-thousandths of an inch. Accordingly the modification of the cutter teeth is correspondingly slight, being in most cases measurable only by accurate instruments. It is, however, a definite and controlled modification. The amount of modification may of course be computed if desired, but it is found on the whole more satisfactory to modify the cutter teeth by the following method: An internal gear is finished with an unmodified tool, after which the lead of the tooth is carefully checked. It will be found ordinarily that two diagonally opposite corners of the gear tooth have a plus helix angle for a short distance adjacent the ends thereof. The amount of this variation from the desired form may be measured with instruments. In order to overcome this error in the finishing of the gear, the cutter tooth is then modified by correcting the helix angle at the corresponding diagonally opposite corners. The amount of this correction is the same as the amount of the error observed in the operation of the unmodified tooth.

Where reference is made in the claims to modifications of a corner of the gear tooth or modification or relief of an obtuse or acute corner, or the surface of the tooth adjacent a corner, an obtuse corner or acute corner or the like, it will be understood that corners formed between the end surfaces and the side surfaces of the teeth, such as the corners 91 to 94 of the tooth 90 shown in Figure 17, are intended. It is appreciated that corners are also formed by the intersection of the top surface of a tooth with the other surfaces, but these corners are not intended. It will be understood that where helical teeth are provided on a gear-like member, the end corners of these helical teeth are acute and obtuse and the angle obtained thereby is approximately equal to 90° plus or minus the helix angle of the gear-like member.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A gear finishing tool for internal gears comprising a gear-like body having helical teeth generally conjugate to the teeth of the gear to be finished and of the same hand as said gear teeth, and adapted to mesh therewith at limited crossed axes, the teeth of said tool having a lesser helix angle than the teeth of said gear, the teeth of said tool having a portion of the tooth surface adjacent an obtuse end corner of the tool tooth relieved, the surfaces adjacent the other two corners of the teeth of said tooth being unrelieved.

2. A gear finishing tool for internal gears comprising a gear-like body having helical teeth generally conjugate to the teeth of the gear to be finished and of the same hand as said gear teeth, and adapted to mesh therewith at limited crossed axes, the teeth of said tool having a lesser helix angle than the teeth of said gear, the teeth of said tool having portions of the tooth surface adjacent both obtuse end corners of the tool teeth relieved, the surfaces adjacent the other two corners of the teeth of said tooth being unrelieved.

3. A gear finishing tool for internal gears comprising a gear-like body having helical teeth generally conjugate to the teeth of the gear to be finished and of the same hand as said gear teeth, and adapted to mesh therewith at limited crossed axes, the teeth of said tool having a portion of the tooth surface adjacent an acute end corner of the tool tooth relieved, the surfaces adjacent the obtuse end corners of the teeth of said tool being unrelieved.

4. A gear finishing tool for internal gears comprising a gear-like body having helical teeth generally conjugate to the teeth of the gear to be finished and of the same hand as said gear teeth, and adapted to mesh therewith at limited crossed axes, the teeth of said tool having portions of the tooth surface adjacent both acute end corners of the tool tooth relieved, the surfaces adjacent the other two corners of the teeth of said tool being unrelieved.

5. A gear finishing tool for internal gears comprising a gearlike body having helical teeth generally conjugate to the teeth of the gear to be finished and of the same hand as said gear teeth, and adapted to mesh therewith at limited crossed axes, the teeth of said tool having a different helix angle than the teeth of said gear, the teeth of said tool having a portion of the tooth surface adjacent an acute end corner of the tool tooth relieved, the surfaces adjacent the two obtuse corners of the teeth of said tool being unrelieved.

6. A gear finishing tool for finishing a particular internal gear comprising a gearlike body having teeth generally conjugate to the teeth of the gear to be finished, and adapted to mesh therewith at limited crossed axes, the teeth of said tool having tooth surface portions adjacent one corner thereof helically relieved inwardly from the end of the teeth for a portion of the length thereof, the amount of such helical relief being just sufficient to cause full line bearing between the teeth of the gear and the relieved portions of said tool teeth.

7. A gear finishing tool for finishing a particular internal gear comprising a gearlike body having teeth generally conjugate to the teeth of the gear to be finished, and adapted to mesh therewith at limited crossed axes, the teeth of said tool having tooth surface portions adjacent diagonally opposite corners thereof helically relieved for a short distance inwardly from the end of the teeth, the other corners being unrelieved, the amount of such helical relief being just sufficient to cause full line bearing between the teeth of the gear and the relieved portions of said tool teeth.

8. A gear finishing tool for finishing internal gears by running in mesh therewith at limited crossed axes, and by simultaneously relatively translating said tool and gear in a direction to shift the teeth of said tool along the tooth spaces of said gear, said tool having teeth of such helix angle that said gear and tool mesh at limited crossed axes, the teeth of said tool having outline surfaces which are generally unmodified as to form and conjugate to the teeth of said gear except adjacent diagonally opposite end corners, said last surfaces adjacent said diagonally opposite end corners being the corners which emerge first from the tooth spaces of said gear, during said translation, said last surfaces being helically relieved to extend at a different helix angle from the unmodified surfaces, the amount of such helical relief being just sufficient to cause full line bearing between the teeth of the gear and the relieved portions of said tool teeth.

9. A gear finishing tool for internal gears comprising a gearlike body having helical teeth generally conjugate to the teeth of the gear to be finished and of the same hand as said gear teeth, and adapted to mesh therewith at limited crossed axes, the teeth of said tool having a different helix angle than the teeth of said gear, the teeth of said tool having portions of the teeth surfaces adjacent both acute end corners of the tool teeth relieved, the surfaces adjacent the two obtuse corners of the teeth of said tool being unrelieved.

ROBERT S. DRUMMOND.